(12) United States Patent
Chou

(10) Patent No.: US 7,891,051 B2
(45) Date of Patent: Feb. 22, 2011

(54) WHEEL ASSEMBLY

(75) Inventor: Chuan-Hai Chou, Taipei Hsien (TW)

(73) Assignee: Haion Caster Industrial Co., Ltd., Taipei Hsien (TW)

( * ) Notice: Subject to any disclaimer, the term of this patent is extended or adjusted under 35 U.S.C. 154(b) by 604 days.

(21) Appl. No.: 11/111,820

(22) Filed: Apr. 22, 2005

(65) Prior Publication Data

US 2006/0236501 A1   Oct. 26, 2006

(51) Int. Cl.
*A45C 5/14*      (2006.01)
*E05F 3/00*      (2006.01)
*B60B 33/00*     (2006.01)

(52) U.S. Cl. .............................. 16/35 R; 16/20; 16/49; 16/29; 16/31 R

(58) Field of Classification Search ............. 16/20, 16/49, 29, 35 R, 35 D, 31 R
See application file for complete search history.

(56) References Cited

U.S. PATENT DOCUMENTS

| | | | | | |
|---|---|---|---|---|---|
| 2,972,163 | A | * | 2/1961 | Ross et al. ................ | 16/35 R |
| 4,449,268 | A | * | 5/1984 | Schnuell ................... | 16/35 R |
| 4,706,328 | A | * | 11/1987 | Broeske ................... | 16/35 R |
| 4,828,236 | A | * | 5/1989 | Inoue ..................... | 267/182 |
| 4,835,815 | A | * | 6/1989 | Mellwig et al. ........... | 16/35 R |
| 4,870,715 | A | * | 10/1989 | Schnuell ................... | 16/35 R |
| 5,214,823 | A | * | 6/1993 | Screen ..................... | 16/35 D |
| 5,328,000 | A | * | 7/1994 | Rutter et al. ............. | 188/1.12 |
| 5,351,364 | A | * | 10/1994 | Zun ....................... | 16/35 R |
| 5,549,039 | A | * | 8/1996 | Ito et al. .................. | 99/340 |
| 6,154,924 | A | * | 12/2000 | Woo ....................... | 16/62 |
| 6,725,501 | B2 | * | 4/2004 | Harris et al. .............. | 16/35 R |
| 6,810,560 | B1 | * | 11/2004 | Tsai ....................... | 16/35 R |
| 6,834,746 | B1 | * | 12/2004 | Lin ......................... | 188/1.12 |
| 6,854,567 | B2 | * | 2/2005 | Suzuki .................... | 188/1.12 |

* cited by examiner

*Primary Examiner*—David Reese
(74) *Attorney, Agent, or Firm*—Muncy, Geissler, Olds & Lowe, PLLC

(57) ABSTRACT

A wheel assembly has a housing, a wheel, a rotating device and a controlling device. The housing has a sleeve, an extending portion extending laterally from the sleeve, and brackets extending from opposite sides of the housing. The wheel is rotatablely mounted between the brackets of the housing via a shaft. A rotating device includes a lower pole for engaging with the sleeve of the housing, and a fixing element at bottom of the lower pole for fixing the lower pole on the sleeve in assembly. The controlling device includes a limiting element and a pressing element cooperating with each other to limit direction of the housing and rotation of the wheel simultaneously. The limiting element is mounted in the extending portion and adjacent to the wheel in assembly. The pressing element is mounted on an end of the extending portion for driving the limiting element.

16 Claims, 5 Drawing Sheets

WHEEL ASSEMBLY

BACKGROUND OF THE INVENTION (a) Field of the Invention

The present invention relates to an improved wheel assembly, and particularly to a wheel assembly which limits direction of a housing thereof and simultaneously limits direction of the housing and a wheel thereof.

(b) Description of the Prior Art

A conventional wheel assembly often comprises a housing and a wheel pivoted on the housing. A pole is formed on an end of the housing for mounting on a bottom of an object. While the wheel rotates, the object moves. Meantime the pole of the housing may bring the wheel to rotate in multiple directions. So the object moves more easily to a predetermined position.

In this design, when the object moves, it bring the wheel to rotate in multiple directions, saving labor during movement of the object. However, ground of the predetermined position is not always flat, for example, it may be a slope. So people have to place obstruction between the wheel and the ground to stop the wheel. Sometimes people also place obstruction between the wheel and the ground to prevent the wheel from rotating. The obstruction often is just a stone, a brick, or some paper, which is picked up at random in the predetermined position. It is hard to stop the wheel and the object when there is nothing to act as obstruction.

SUMMARY OF THE INVENTION

Accordingly, an object of the present invention is to provide a wheel assembly which has controlling device to limit direction of a housing thereof and to simultaneously limit directions of the housing and a wheel thereof.

To achieve the above object, the wheel assembly of the present invention comprises a housing, a rotating device, a wheel and a controlling device assembled together. The housing includes a sleeve, an extending portion extending laterally from the sleeve, and brackets extending from opposite sides of the housing. The rotating device includes a lower pole for engaging with the sleeve of the housing, and a fixing element at bottom of the lower pole for fixing the lower pole on the sleeve in assembly. The wheel is rotatablely mounted between the brackets of the housing via a shaft. The controlling device includes a limiting element and a pressing element. The limiting element is mounted in the extending portion and adjacent to the wheel in assembly. The pressing element is mounted on an end of the extending portion for driving the limiting element. The limiting element defines a slot at an end thereof and forms a latch at an opposite end. A spring tongue is stamped from substantially a middle of the limiting element for abutting against inner surfaces of the extending portion.

DETAILED DESCRIPTION OF THE PREFERRED EMBODIMENTS

Figure 1:
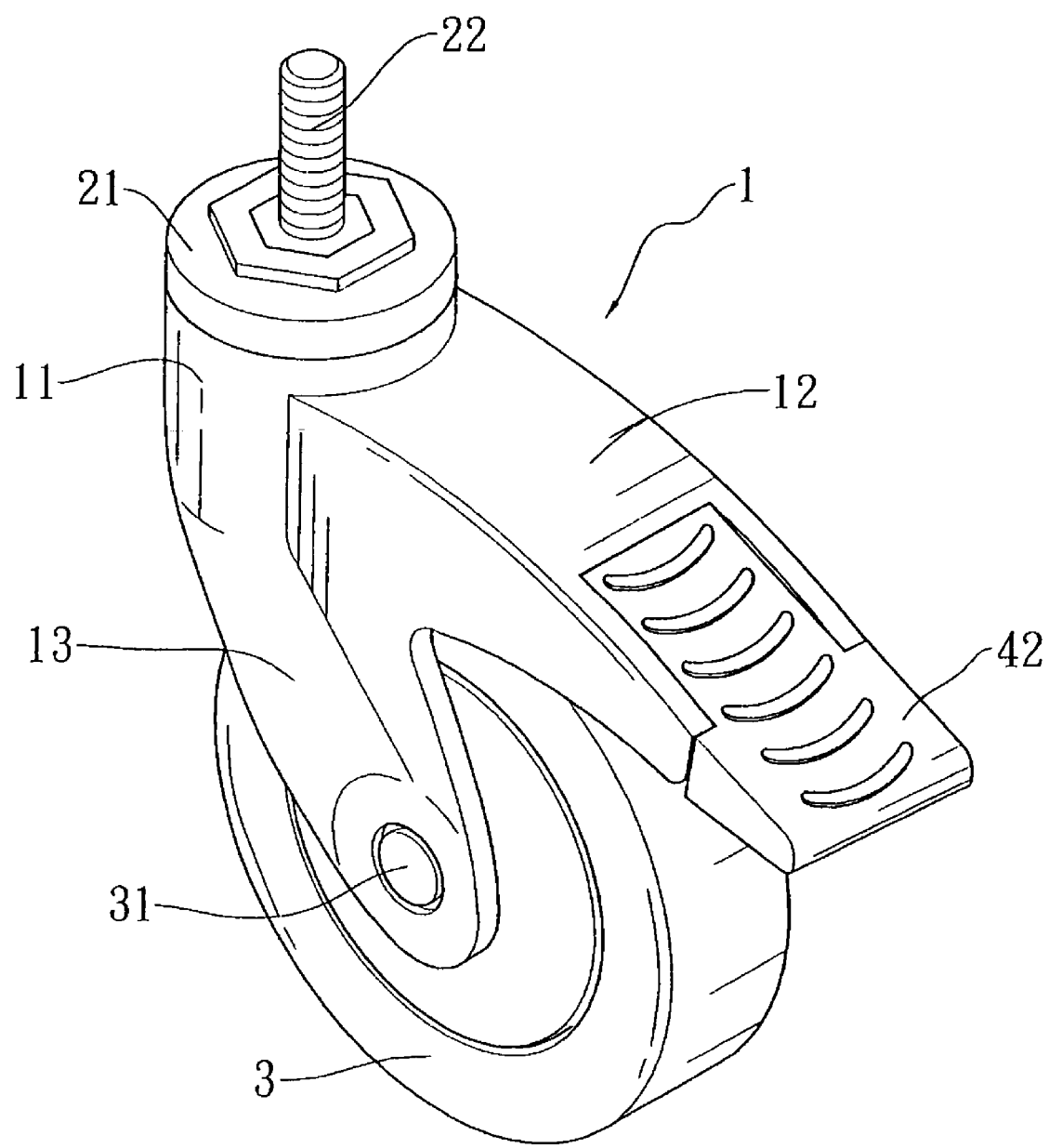
FIG. 1 is a perspective view of a wheel assembly according to the present invention.
Figure 2:
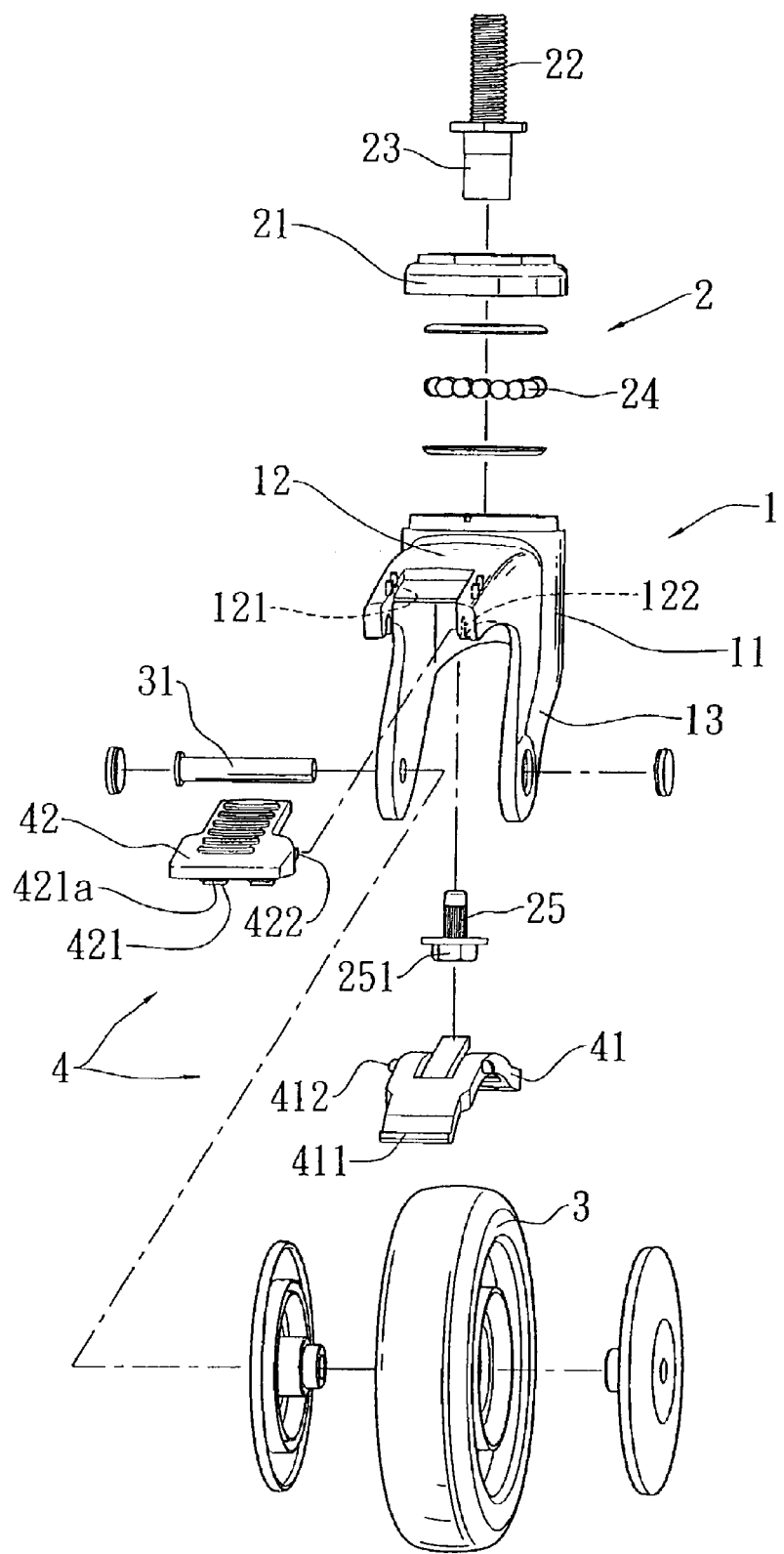
FIG. 2 is an exploded view of the wheel assembly of FIG. 1.
Figure 3:
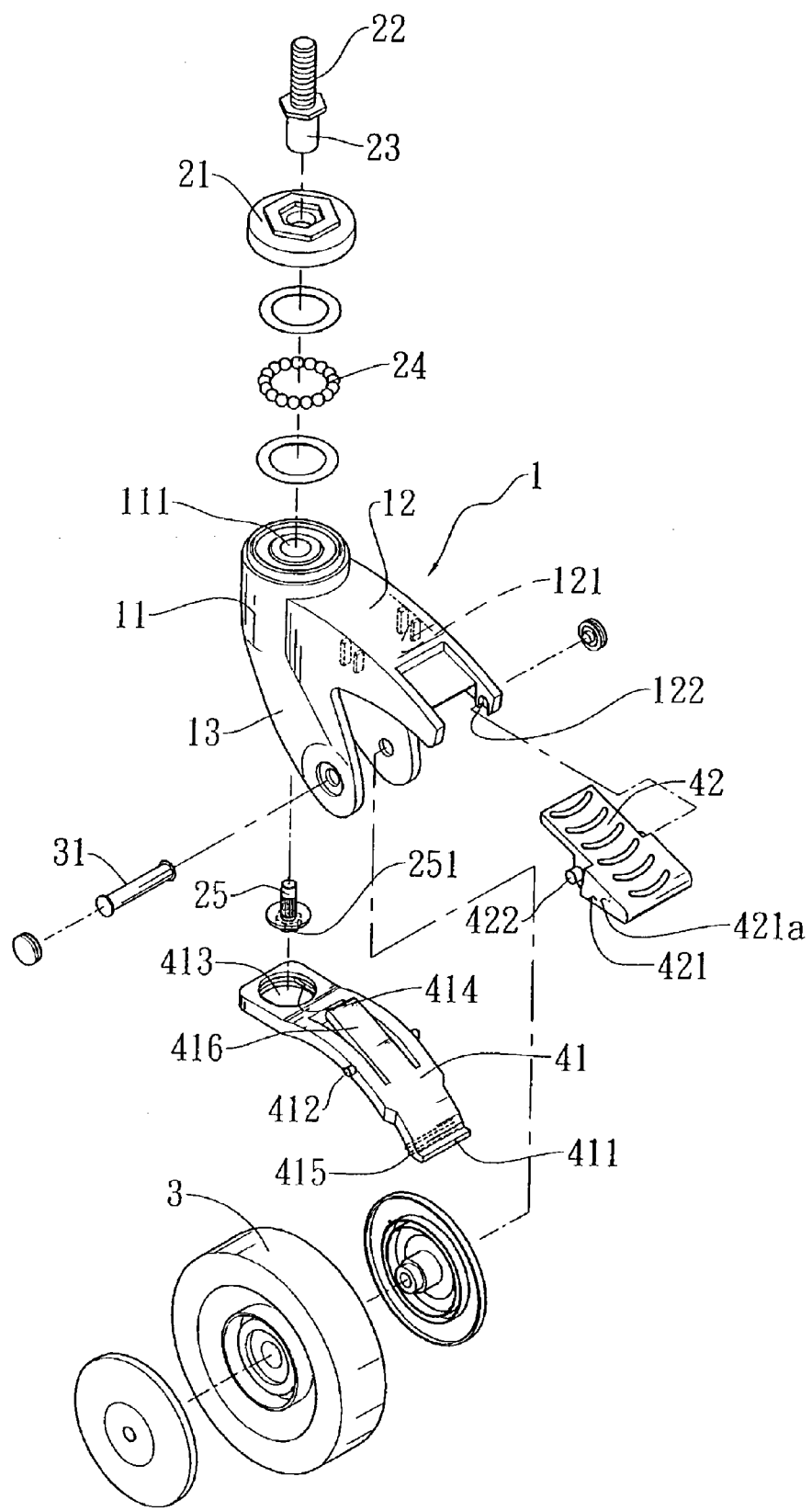
FIG. 3 is another exploded view of the wheel assembly of FIG. 1.

With reference to FIGS. 1 to 3, an improved wheel assembly 1 in accordance with the present invention comprises a housing 1, a rotating device 2, a wheel 3 and a controlling device 4 assembled together. The controlling device 4 does not only limit direction of the housing 1, but also limits directions of the housing 1 and the wheel 3 simultaneously.

The housing 1 includes a sleeve 11 defining an axis hole 111 therethrough. An extending portion 12 extends laterally from outer peripheral of the sleeve 11. Assembling portions 121 are respectively formed on a substantial middle of opposite inner walls of the extending portion 12. Engaging portions 122 are respectively formed on proximate ends of opposite inner walls of the extending portion 12. Brackets 13 respectively extend downwardly and laterally from opposite sides of the sleeve 11.

The rotating device 2 includes a cover 21, an upper pole 22 and a lower pole 23 unitarily formed with each other, a rolling element 24 and a fixing element 25. The lower pole 23 is engaged to the sleeve 11 of the housing in assembly. The cover 21 is mounted on a top of the sleeve 11. The rolling element 24 is sandwiched between the cover 21 and the sleeve 11. The lower pole 23 extends downwardly through the cover 21 and is mounted on the axis hole 111 of the cover 21. The upper pole 22 extends beyond the cover 21. The fixing element 25 is mounted on a bottom of the lower pole 23 and has a cap 251 at a lower end thereof for fixing the lower pole 23 on the sleeve 11 in assembly.

A shaft 31 extends through the wheel 3 and the brackets 13 for mounting the wheel 3 rotatablely between the brackets 3.

The controlling device 4 includes a limiting element 41 and a pressing element 42. The limiting element 41 is mounted in the extending portion 12 and adjacent to the wheel 3 when assembled. The pressing element 42 is mounted on an end of the extending portion 12 and drives the limiting element 41. A tail 411 extends and bends from an end of the limiting element 41 for engaging with the pressing element 42. The pressing element 42 defines a first notch 421 and a second notch 421a for respectively engaging with the tail 411 of the limiting element 41. The limiting element 41 forms axis protuberances 412 at opposite sides thereof for pivotably engaging with the assembling portions 121 of the extending portion 12. The limiting element 41 defines a slot 413 at an end far from the tail 411. A ring projection 414 is formed on inner peripheral of the slot 413 for latching with the cap 251 of the fixing element 25. A latch 415 is formed at an end opposite to the slot 413 and consists of a plurality of ribs (not labeled). A spring tongue 416 is stamped from substantially a middle of the limiting element 41 for abutting against inner surfaces of the extending portion 12. The pressing element 42 forms axis tabs 422 at opposite sides thereof for pivotably engaging with the engaging portions 122 of the extending portion 12.

Figure 4:
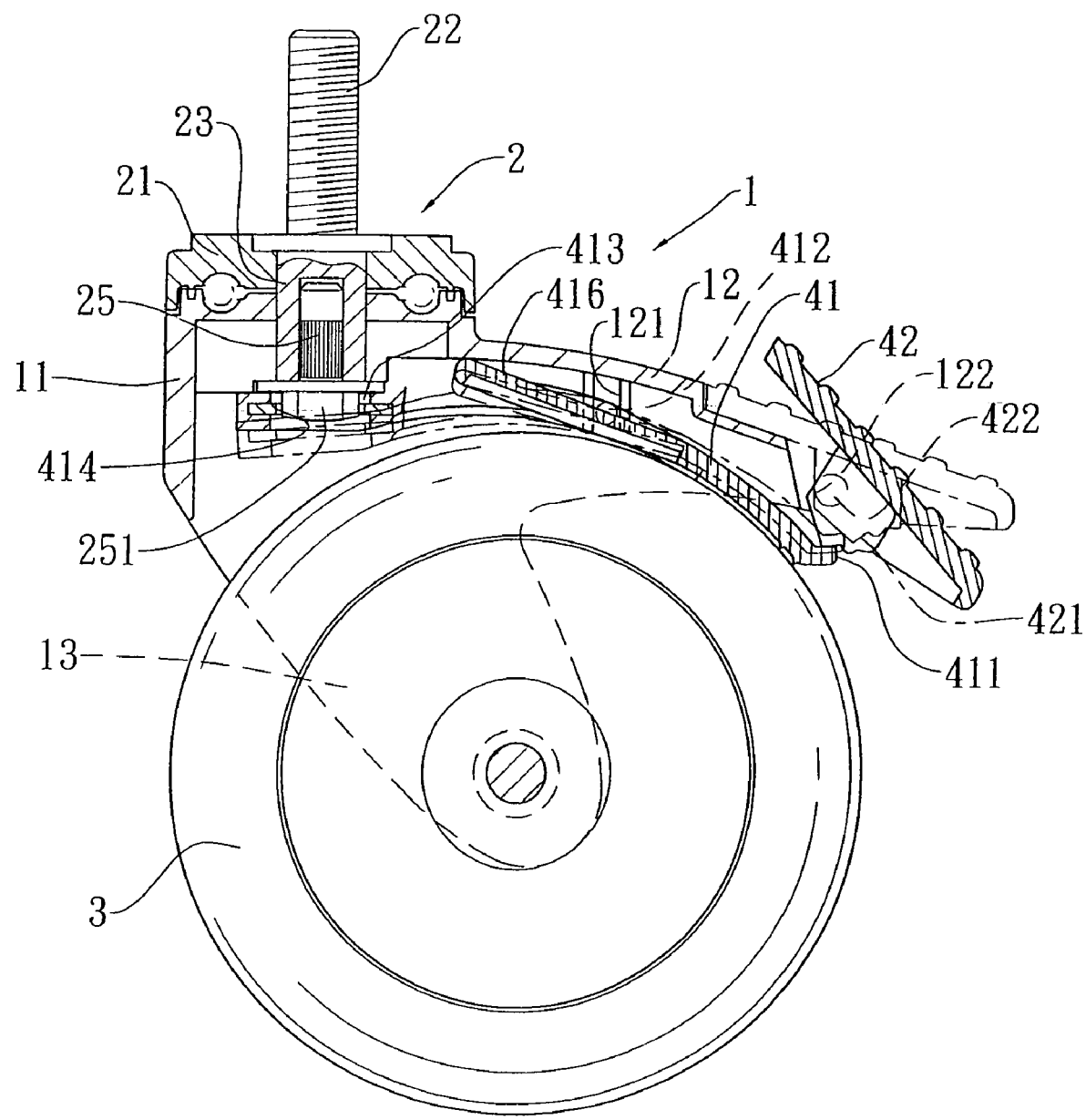
FIGS. 4 and 5 are sectional views of the wheel assembly in use.
Figure 5:
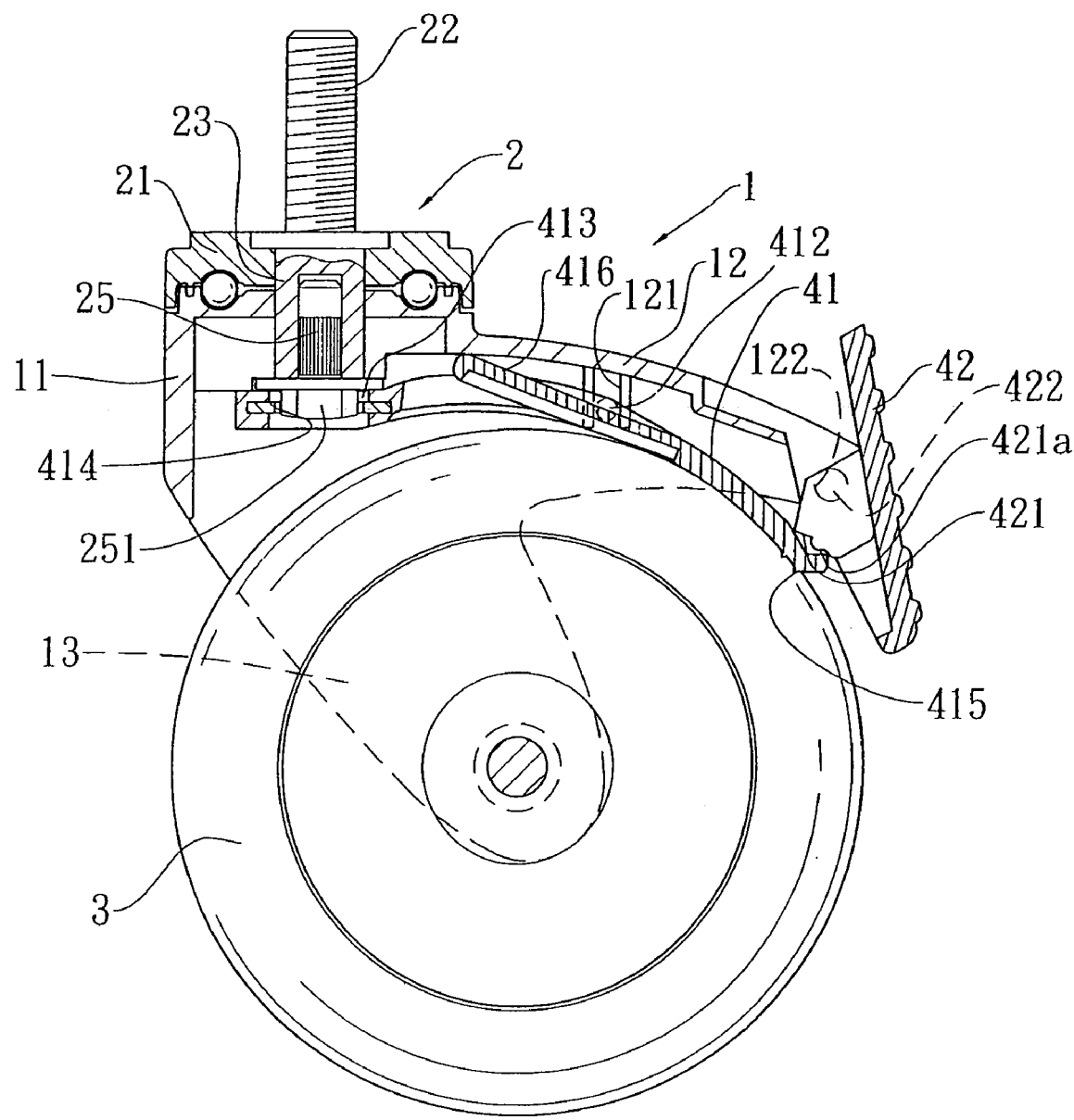

Referring to FIGS. 4 and 5, in use, the upper pole 22 of the rotating device 2 is assembled on a bottom of an object (not shown). The object moves along with movement of the housing 1 and the wheel 3. When the housing 1 moves, the rotating device 2 can drive the wheel 3 to rotate in multiple directions, whereby the object moves more easily. When the object is needed to stop at a predetermined position, or when the housing 1 does not need to rotate in multiple directions, the pressing element 42 is pressed downwardly. Sequentially, the axis tabs 422 rotate relative to the engaging portions 122 until the first notch 421 abuts against the tail 411 of the limiting element 41. The axis protuberances 412 rotate relative to the assembling portions 121, the fixing element 25 extends into the slot 413 until the ring projection 414 abuts the cap 251. The fixing element 25 and the lower pole 23 cooperate with each other, thus the housing 1 can not move in multiple directions (as shown in FIG. 4).

When the object moves to a predetermined position, the pressing element 42 is pressed down to stop the housing 1 and the wheel 3. The axis tabs 422 rotate relative to the engaging portions 122 until the second notch 421a abuts against the tail 411 of the limiting element 41. The axis protuberances 412 rotate relative to the assembling portions 121, and the latch 415 of the limiting element 41 biases against the wheel 3, whereby the wheel 3 is limited to rotate. The limiting element 41 and the pressing element 42 cooperate with each other to limit the housing 1, and to limit direction of the housing 1 and rotation of the wheel 3 simultaneously (as shown in FIG. 5).

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A wheel assembly comprising:
   a housing having a sleeve, an extending portion extending laterally from the sleeve, and brackets extending from opposite sides of the housing;
   a rotating device having a lower pole inserted through an axis hole of the sleeve of the housing, and a fixing element having a first end connected to a bottom of the lower pole and fixing the lower pole on the sleeve in assembly, the fixing element having a cap located on a second end thereof;
   a wheel rotatably mounted between the brackets of the housing via a shaft; and
   a controlling device having a limiting element and a pressing element, the limiting element being mounted in the extending portion and adjacent to the wheel in assembly, the pressing element being mounted on an end of the extending portion for driving the limiting element, the limiting element having a slot located through a first end thereof and a latch formed on a second end thereof, the cap of the fixing element is located in the slot of the limiting element, a spring tongue being stamped from substantially a middle of the limiting element for abutting against inner surfaces of the extending portion,
   wherein a ring projection is formed on an inner peripheral edge surface of the slot and selectively engaging the cap of the fixing element.

2. The wheel assembly as claimed in claim 1, wherein assembling portions are respectively formed on substantial middle of opposite inner walls of the extending portion, and wherein the limiting element forms axis protuberances at opposite sides thereof for pivotally engaging with the assembling portions.

3. The wheel assembly as claimed in claim 2, wherein the limiting element forms axis protuberances at opposite sides thereof for pivotally engaging with the assembling portions of the extending portion.

4. The wheel assembly as claimed in claim 1, wherein engaging portions are respectively formed on proximate ends of opposite inner walls of the extending portion, and wherein the pressing element forms axis tabs at opposite sides thereof for pivotably engaging with the engaging portions of the extending portion.

5. The wheel assembly as claimed in claim 4, wherein the pressing element forms axis tabs at opposite sides thereof for pivotably engaging with the engaging portions of the extending portion.

6. The wheel assembly as claimed in claim 1, wherein the rotating device further comprises a cover mounted on top of the sleeve, and a rolling element sandwiched between the cover and the sleeve, and wherein an upper pole is unitarily formed with the lower pole for mounting on an object.

7. The wheel assembly as claimed in claim 1, wherein the latch consists of a plurality of ribs.

8. The wheel assembly as claimed in claim 1, wherein a tail extends and bends from an end of the limiting element for engaging with the pressing element.

9. A wheel assembly comprising:
   a housing having a sleeve, an extending portion extending laterally from the sleeve, and brackets extending from opposite sides of the housing;
   a rotating device having a lower pole inserted through an axis hole of the sleeve of the housing, and a fixing element having a first end connected to a bottom of the lower pole and fixing the lower pole on the sleeve in assembly, the fixing element having a cap located on a second end thereof;
   a wheel rotatably mounted between the brackets of the housing via a shaft; and
   a controlling device having a limiting element and a pressing element, the limiting element being mounted in the extending portion and adjacent to the wheel in assembly, the pressing element being mounted on an end of the extending portion for driving the limiting element, the limiting element having a slot located through a first end thereof and a latch formed on a second end thereof, the cap of the fixing element is located in the slot of the limiting element, a spring tongue being stamped from substantially a middle of the limiting element for abutting against inner surfaces of the extending portion,
   wherein the pressing element has a first notch and a second notch selectively and sequentially engaging a top surface of the second end of the limiting element, the engagement of said first notch causing said rotating device to be restrained and the engagement of the second notch causing said wheel to be restrained.

10. The wheel assembly as claimed in claim 9, wherein assembling portions are respectively formed on substantial middle of opposite inner walls of the extending portion, and wherein the limiting element forms axis protuberances at opposite sides thereof for pivotably engaging with the assembling portions.

11. The wheel assembly as claimed in claim 10, wherein the limiting element forms axis protuberances at opposite sides thereof for pivotably engaging with the assembling portions of the extending portion.

12. The wheel assembly as claimed in claim 9, wherein engaging portions are respectively formed on proximate ends of opposite inner walls of the extending portion, and wherein the pressing element forms axis tabs at opposite sides thereof for pivotably engaging with the engaging portions of the extending portion.

13. The wheel assembly as claimed in claim 12, wherein the pressing element forms axis tabs at opposite sides thereof for pivotably engaging with the engaging portions of the extending portion.

14. The wheel assembly as claimed in claim 9, wherein the rotating device further comprises a cover mounted on top of the sleeve, and a rolling element sandwiched between the cover and the sleeve, and wherein an upper pole is unitarily formed with the lower pole for mounting on an object.

15. The wheel assembly as claimed in claim 9, wherein the latch consists of a plurality of ribs.

16. The wheel assembly as claimed in claim 9, wherein a tail extends and bends from an end of the limiting element for engaging with the pressing element.

* * * * *